United States Patent [19]

Rosenhaupt

[11] 3,761,626

[45] Sept. 25, 1973

[54] METHOD AND APPARATUS FOR DISTORTION MEASUREMENT IN DATA TRANSMISSION NETWORKS

[75] Inventor: Fritz Rosenhaupt, Munich, Germany

[73] Assignee: Siemens Aktiengesellschaft, Berlin and Munich, Germany

[22] Filed: June 2, 1971

[21] Appl. No.: 149,166

[30] Foreign Application Priority Data

June 3, 1970 Germany.................. P 20 27 291.7

[52] U.S. Cl................................................ 178/69 A

[51] Int. Cl. ............................................ H04l 25/02

[58] Field of Search.............. 178/69 R, 69 A, 69 N, 178/23 A; 340/146.1 D

[56] References Cited

UNITED STATES PATENTS 2,342,318 2/1944 Wilkerson........................ 178/69 A 3,323,111 5/1967 Waghorne........................ 178/69 A

*Primary Examiner*—Kathleen H. Claffy

*Assistant Examiner*—Douglas W. Olms

*Attorney*—Birch, Swindler, McKie & Beckett

[57] ABSTRACT

A process is described for accomplishing distortion measurements, particularly of start-stop distortion in transparent data networks wherein a fixed number of specific pulses are repeatedly synchronously transmitted by a sending station. A fixed sequence and number of pulses ($2^n-1$) are formed using a shift register. In the sending station a series of start-stop pulses are generated with the time interval between the start and stop pulses being adjusted in accordance with the code frame used. The start-stop pulses are inserted in the aforementioned pulse sequence, and the start-stop code signals are transmitted. Distortion measurements of the start-stop signal are made in the known manner in a receiving station.

6 Claims, 5 Drawing Figures

METHOD AND APPARATUS FOR DISTORTION MEASUREMENT IN DATA TRANSMISSION NETWORKS

BACKGROUND OF THE INVENTION

The subject of the invention is a process for the distortion measurement, especially, of the start-stop-distortion in teletypewriter signals, in code transparent data networks, in which on the sender side a fixed number of certain steps, also referred to herein as pulses, is repeatedly synchronously sent out.

In the existing data networks, for example, in the telex network, the measuring of start-stop-distortion is possible with the help of a fixed test text. It is, however, prerequisite, for this purpose, that a data signal (data character) be transmitted in a unified code, for example, in five code (CCITT-Telegraph Alphabet No. 2). In data networks, which are not bound to a certain code, an individual test text must be created for each code. In order to avoid this, a limitation to the isochronous distortion measurement was undertaken. The test text was fixed on an international level (CCITT) through a 511-bit-pseudo-random text. This text has a maximum cycle length of 511 bits ($2^9$—1bits) and is formed with the help of a nine stage feedback shift register. The text given out from the shifting register, which consists of binary steps, possesses a very specific series (order) of individual steps (CCITT-Recommendation V51, V52, V53, October, 1968). This text offers no possibility for the measurement of the stop-start-distortion, because this text can take into consideration no signals of any particular form. The measurement of the start-stop-distortion of a transmission system would, however, always be desired and advantageous, when end apparatus are to be connected at the sending and receiving sides, which work in a start-stop-operation.

It is a task of the invention to provide a process which makes possible a measurement of the start-stop-distortion with the application of the standardized 511-bit-pseudo-random text.

SUMMARY OF THE INVENTION

The solution of the task consists therein that a fixed series and number of steps ($2^n$—1) is formed in a known manner with the help of a multistage feedback shift register, that a series of start and stop steps is generated at the sender side, that the separation in time between the start step and the stop step is adjusted corresponding to the desired code frame, that the start and stop steps are inserted into the series of steps given off by the shifting register, that the start-stop-code signals are transmitted synchronously over the transmission system to be measured and that the distortion measurement takes place with known devices at the receiver side.

Through a modest additional investment, it is possible to measure the start-stop-distortion of the synchronously transmitted start-stop-signals (characters). In addition, with the transmission of the start-stop-signals, there also exists the possibility to determine the frequency (rate) of errors. Through the filling up of the maximum cycle length of the pseudo-random-text with stop-steps, it is possible to send the same series of start-stop signals within the maximum cycle. Also, the transmission of a stop-step with 1.5 fold, 2 fold, or 3 fold step duration is possible. In a simple manner, predistated code signals can be formed and transmitted.

BRIEF DESCRIPTION OF THE DRAWINGS

Details of the invention are explained with reference to principal circuit diagrams and time diagrams.

DETAILED DESCRIPTION OF THE DRAWINGS

Figure 1:
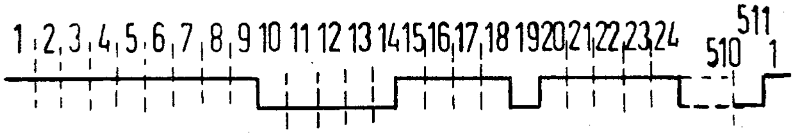
FIG. 1 shows the pseudo-random text.
Figure 2:
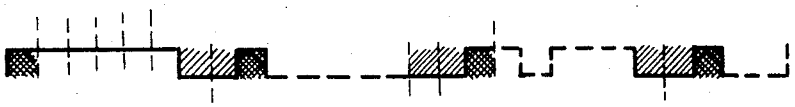
FIG. 2 shows the start-stop steps in the 5 step code.
Figure 4:
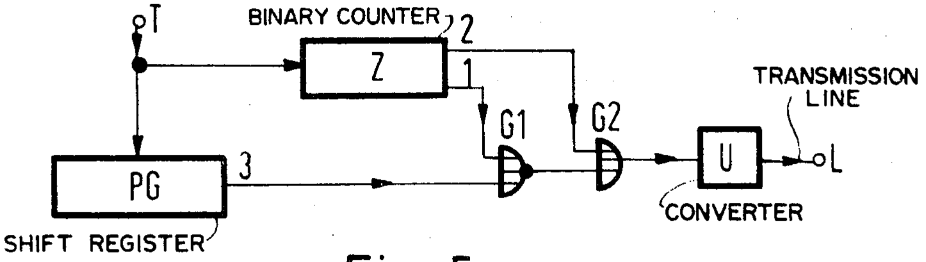
FIG. 4 and FIG. 5 show with reference to block circuit diagrams, advantageous working examples of the inventive process.

In FIG. 4, is shown a block circuit diagram of the sending device of the new measuring process. A timing generator (not shown) delivers a step-timing pulse T, which advances the shifting register PG and the binary counter Z further. The multi-stage, back coupled shifting register, which, for example, is constructed in $n$ stages, gives off at output 3 a very specific series of steps, which series repeats itself after a maximum cycle length of $2^n$—1 bits. With the international standard requirement of nine stages of the shifting register, the maximum cycle consists of 511 bits ($2^9$—1). FIG. 1 shows the series of steps given off at the output 3 of the shifting register PG. This pseudo-random text is applied to NOR gate G1. The output 1 of the counter Z lies on the other input of the gate G1. The counter Z can be adjusted to different counter positions depending on the selected code frame. With a 5-step code, it is adjusted to the counter position 7, while with a 7-step code, it is adjusted to the counter position 9 (a simple stop-step is presumed thereby). At the first counter position, the counter gives off a start-step at the output 1. While at the last counter position, a stop-step arises at the output 2. The start-step is inserted into the pseudo-random text over the gate G1. The output of the gate G1 is negated and is routed to OR gate G2. The output 2 of the counter is applied to the second input of the gate G2, over which the stop steps are given off and inserted into the pseudo-random text. The stop-step length can be selected as a whole number multiple of the step duration. Start-step-code signals in the desired code frame arises at the output of the gate G2, whereby the information steps between the start-step and the stop-step and the stop-step correspond to the pseudo-random text. FIG. 2 shows the start-stop-code signal (the crossed-hatched area) formed from the pseudo-random text. The stop-step (the hatched area) possesses double step duration. The converter U amplifies the start-stop-signals to the correct voltage value and sends them with the correct polarity synchronously over the transmission line L.

Figure 3:
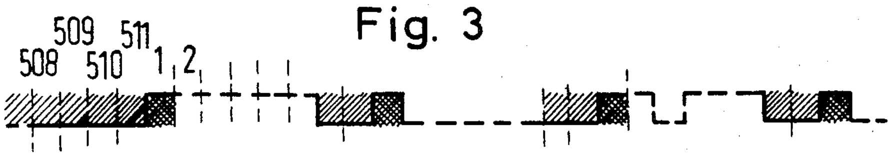
FIG. 3 shows the inserting of the start-stop steps in the 5 step code, when the same start-stop-code signal series is to be transmitted in each repitition cycle of the pseudo-random text.
Figure 5:
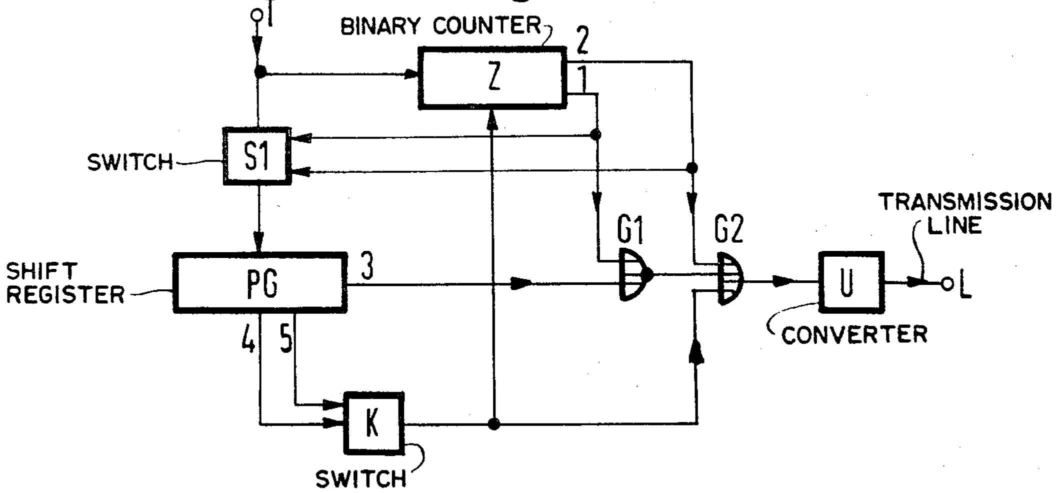

FIG. 5 represents a further embodiment of the sending device, according to FIG. 4. With the setting of a 1.5 fold stop-step it is necessary to separate the timing signal from the shifting register for a short time, so that the shifting register does not operate during this period and no step distortions arise. At the beginning of the stop-step, which arises at the output 2 of the counter Z, the switching stage S1 cuts off the step-timing signal from the shifting register PG, so that during this time, a stop-step of optional length can be given out. At the beginning of the start-step, which arises at the output 1 of the counter, the switching stage S1 is switched back to the rest position, in which position the step-timing signal T reaches the shifting register. For different measurements, for example, a measurement of the rate of errors, it is essential that the same start-stop signals be sent out in each maximum cycle. Usually, the maximum cycle is not a whole number multiple of the code frame of the start-stop signal, so that shortly before the end of the cycle, some steps are left over, which normal operation, would belong to the first code signals of the next cycle. Through the selection of the code frame, it is determined at which position of the shifting register the last complete start-stop-signal in a cycle will be given out. At this position, an inquiry gate is set, which then gives off an impulse over the output 4 of the shifting register to the trigger stage K, which is thereby triggered from the rest position to the work position. In the work position, the trigger stage K gives off the stop-step polarity to an additional input of the three input OR gate G2, and holds the counter Z fixed in the first counter position, until the shifting register PG has finished the current cycle with the $(2^n-1)$ step, and thereby switches the trigger stage K back to the rest position over output 5. At the beginning of the pseudo-random text, the same start-stop-code signals are given off as in the last (previous) cycle. FIG. 3 shows the start-stop-code signals, whereby the last steps 408 through 511 of the pseudo-random text are filled up with stop-steps. The stop-step has a duration of two code steps. Through the switching on of a positioning member for the extending or shortening of the start-step with reference to the step starting one, it is possible to send out leading or lagging distorted start-stop signals. An additional stage for the parity bit formation makes possible for the sending out of a start-stop-code signal with an inserted parity step. Thereby, the parity step is also inserted into the pseudo-random text over a gate.

I claim:

1. Process for distortion measurement of data signals, such as start-stop teletypewriter signals and the like, having a fixed number of specific pulse signals which are repeatedly synchronously transmitted by a sending station comprising the steps of:

forming a predetermined number and series of pulses for said repeated transmission, generating a series of start and stop pulses in the sending station, adjusting the time interval between the start pulse and the stop pulse in accordance with the length of a predetermined code frame, inserting by replacing pulses in the series with start and stop pulses, said start and stop pulses into said predetermined series of pulses, transmitting the start and stop code pulses over a transmission system and measuring the distortion of the start and stop signals at a receiving station.

2. The process defined in claim 1, wherein a shift register is used to form said predetermined series of pulses, and wherein the stop pulse polarity is transmitted until the next start pulse under the control of said shift register.

3. The process defined in claim 2 wherein said shift register is under the control of a pulse timing signal, and wherein said predetermined code frame is formed by a presettable counter, said counter being under the control of said pulse timing signals.

4. Apparatus for measuring distortion in data transmission networks, comprising:

shift register means for producing a check code text having a predetermined cycle length, means for producing a sequence of start and stop code pulses, means for adjusting the time interval between a start pulse and a stop pulse in accordance with the duration of a predetermined code frame and means for combining said start and stop pulses with said check code text by replacing pulses of the text with start and stop pulses for transmission to a receiving station and means in said receiving station for measuring the distortion of said start and stop pulses.

5. The apparatus defined in claim 4 wherein said shift register is a multistage feedback shift register controlled by a time signal, wherein said adjusting means is a presettable binary counter controlled by said timing signal and includes means for selectively adjusting the number of said timing signals counted and means for producing a start pulse during the first count thereof and a stop pulse at the end of the counting interval and wherein said combining means is a logic gate circuit.

6. The apparatus defined in claim 5 further comprising a bistable switching stage for controlling the application of said timing signal to said shift register and wherein said binary counter is connected to said bistable switching stage so as to cause said switching stage to permit the passage of said timing signals upon the beginning of a counting interval and to cause said switching stage to switch to a position blocking the passage of said timing signals at the end of the counting interval and further comprising additional switching means operable responsive to a predetermined position of operation of said shift register to apply a signal of stop pulse polarity to said logic gate circuit for holding said counter in its initial counting position until said shift register has operated through said predetermined cycle length, the completion of said cycle length by said shift register causing said additional switching stage to switch back to a non-operating position.

* * * * *